(No Model.)
H. STRASSER.
PULVERIZING CULTIVATOR.
No. 526,207. Patented Sept. 18, 1894.
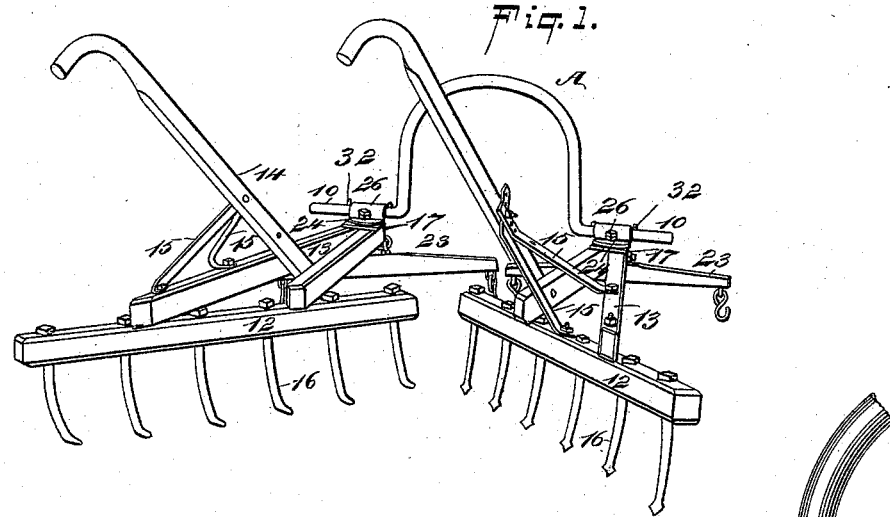
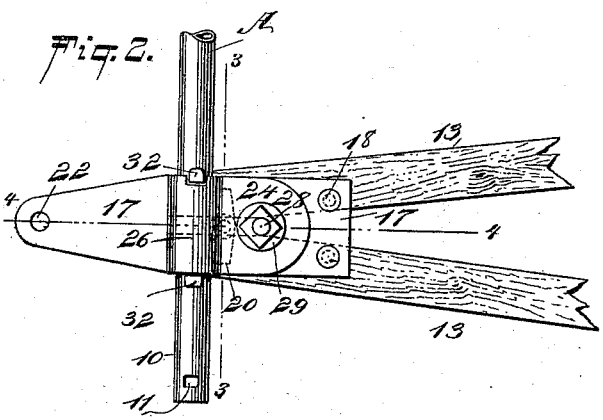
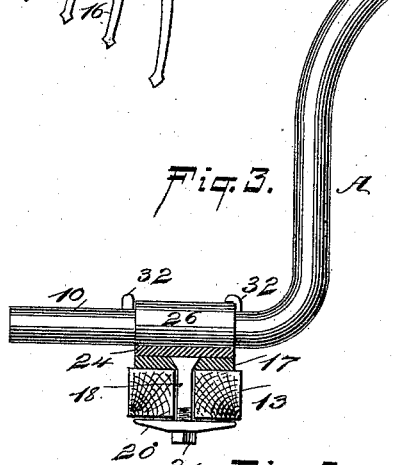
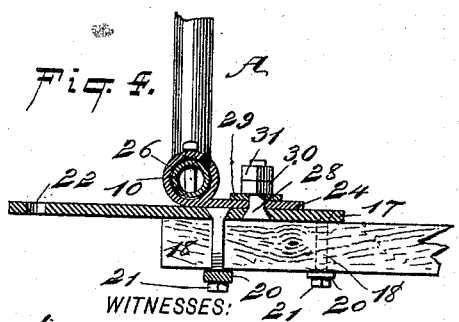
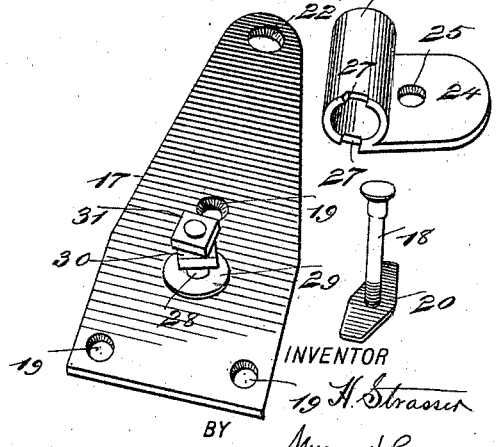
WITNESSES:
William Gaebel
C. Sedgwick
INVENTOR
H. Strasser
BY
Munn & Co
ATTORNEYS.

UNITED STATES PATENT OFFICE.

HENRY STRASSER, OF THORNBURG, IOWA.

PULVERIZING-CULTIVATOR.

SPECIFICATION forming part of Letters Patent No. 526,207, dated September 18, 1894.

Application filed March 8, 1894. Serial No. 502,862. (No model.)

*To all whom it may concern:*

Be it known that I, HENRY STRASSER, of Thornburg, in the county of Keokuk and State of Iowa, have invented a new and Improved Pulverizing-Cultivator, of which the following is a full, clear, and exact description.

My invention relates to a pulverizing cultivator, and it has for its object to improve upon the construction of the cultivator for which Letters Patent were granted to me July 3, 1893, No. 512,408.

The especial object of this invention is to construct the cultivator in such manner that two teeth-carrying bars may be located at angles to one another and adjustable upon a yoke in such manner as to accommodate the cultivator to rows of varying width.

Another object of the invention is to so construct a double cultivator that either one of the sections may be used as a single cultivator when desired.

Another object of the invention is to provide a simple, durable and economic attachment between the beams or drag bars connected with the teeth-carrying bars or beams and the yoke, whereby each section of the cultivator may be adjusted upon the said yoke expeditiously and conveniently, and maintained in the position in which it is placed.

Another object of the invention is to construct the teeth of the cultivator in such a manner that they will thoroughly pulverize the ground over which they may be passed, and will effectually remove weeds that may be in their path.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a perspective view of the improved cultivator. Fig. 2 is a detail plan view of the connection between the drag bar or beam of a section and the yoke. Fig. 3 is a section taken practically on the line 3—3 of Fig. 2. Fig. 4 is a section taken at right angles to the section shown in Fig. 3 and practically on the line 4—4 of Fig. 2; and Fig. 5 is a perspective view of the various parts composing the coupling between the drag bar or beam and the yoke.

The yoke A is preferably made of tubing bent upon itself to form the usual inverted U body section, and a horizontal arm 10, extending outward from each extremity of the body, and each of the arms 10, is provided with a series of apertures or openings 11 which extend through from top to bottom, one of the apertures or openings being preferably located near the body of the yoke. Each section of the cultivator consists of a toothed beam 12, a drag bar or beam 13 preferably substantially V-shaped, the members of the said beams being attached at their diverging ends to the upper portion of the toothed beam 12 of the section, as shown in Fig. 1, the attachment being so made that the drag bar or beam 13 while horizontally located will be at more or less of an acute angle to the beam 12, whereby when the drag bars or beams 13 of two sections are connected with the arms 10 of the yoke, the opposing toothed beams will be at angles to one another, converging at their forward ends, or pointing at said ends in direction of the yoke body, the outer or rear ends of the toothed beams being made to diverge as far as may be desired.

Each section of the cultivator is further provided with a handle 14, preferably attached to the inner member of the drag beam or bar 13. The handles are further braced by bars 15, both of which may be attached to the outer member of a drag bar or beam at predetermined intervals apart, the upper ends of the braces being brought together and adjustably attached to the handle; or one of the said braces at its lower end may be attached to the toothed beam instead of to the drag beam, as may be found desirable. The teeth 16, are secured in the beams 12 in any approved manner, and the said teeth are arranged longitudinally along the beam, and are curved in direction of the forward end of the beam and face in that direction. Each tooth terminates at its lower end in a spade point, which point serves to effectually pulverize the ground and will thoroughly remove the roots of weeds in its path.

The coupling between the drag bar or beam of a section and the yoke A is effected in the following manner: A plate 17, wider at its rear than at its forward end, is secured by bolts 18 upon the upper face of the drag beam at its forward or contracted end, the heads of the bolts being made to fit in countersunk openings 19 made in the plate, and the bolts after having passed through the members of the beam have washers 20, preferably of elongated shape, located upon their lower ends, as shown in Fig. 3, held in position by a nut 21 secured upon the bolt. In this manner the top of the plate 17 is perfectly smooth. The plate is provided at its outer end with an opening 22 to receive the hook or coupling of a single-tree 23. A second plate 24 is located upon the plate 17 preferably near its rear, and the plate 24 is provided with an opening 25 to receive the bolt, and with a tubular socket 26 located at its forward end, the tubular socket being provided with recesses 27 in one of its ends, one recess at the top and the other at the bottom, as shown in Fig. 5. A bolt 28 is employed to connect the two plates. This bolt is passed first through an opening in the plate, as shown in Fig. 4, the head of the bolt being countersunk in said opening. The bolt is then passed up through the opening 25 in the plate 24. A washer 29 is then passed over the bolt to an engagement with the said plate 24, and two nuts, a lock nut and a jam nut are then screwed upon the bolt one to an engagement with the washer, as is likewise shown in Fig. 4, the said bolts being designated as 30 and 31. The arms 10 of the yoke are passed through the sockets 26 in the plate 24, and after the said plate has been adjusted laterally upon the plate 17 to cause the toothed beams to stand at more or less of an angle to each other; and the sections are adjusted upon the yoke to accommodate them to the width of the row being cultivated, by moving the sockets 26 of the sections to or from the outer ends of the yoke arms 10. Pins 32, are then passed through the openings 11 in the said yoke arms, one at each end of each socket 26 as shown in Fig. 2, one of the pins or keys being made to enter the recesses 27, which prevents the plate 24 from turning. At the same time the recesses 27 are sufficiently wide to permit the beams 13 to move upward or downward.

This cultivator will thoroughly cultivate the ground, leaving it in fine condition for seeding grain of all kinds, and is especially adapted for the cultivation of corn, cotton, and all crops that are worked in rows. The cultivator is exceeding light in draft, pulverizes the ground to a great depth, and does not turn it over. It will cultivate wet ground without leaving it in condition to bake in the hot sun. Furthermore, the cultivator will not turn up fresh weed seed to germinate, and small corn may be worked with it as soon as the corn can be rowed.

Having thus described my invention, I claim as new and desire to secure by Letters Patent—

1. In a cultivator, the combination, with a yoke, of a cultivator section comprising a toothed beam, a drag beam and a handle connected with the latter, and a coupling carried by the drag beam; the said coupling consisting of a horizontally turning plate pivoted adjustably upon the forward end of the drag beam, provided with a socket at its forward portion adapted to receive horizontal extensions from the yoke, and pins adjustably located in the side extensions of the yoke at each side of the said socket, as and for the purpose set forth.

2. In a cultivator, the combination with a yoke, provided with outwardly-extending horizontal arms having series of apertures therein, of the cultivators, each consisting of a toothed beam, a drag beam connected with the toothed beam, and a coupling carried by the drag beam, said coupling consisting of a plate adjustably secured to the drag beam and provided with a tubular socket at its forward end, through which one of the said horizontal arms extends said socket having a recess in one end, and pins located in the apertures of the yoke extension, one at each side of the socket, one of the pins entering the recesses in the socket, as and for the purpose specified.

3. In a cultivator, the combination, with a yoke provided with horizontal apertured extensions projected outwardly from the extremities of its body, of a tooth-carrying beam, a drag beam secured to the tooth-carrying beam at an acute angle, a wear plate attached to the forward end of the drag beam, extending beyond the same and fitted to receive a single-tree, a plate adjustably placed upon the wear plate and provided with a socket in its forward end adapted to loosely receive an extension of the yoke, said socket being provided with recesses in one of its ends, and pins located in the apertures of the yoke extension, one at each side of the socket, one of the pins entering the recesses in said socket, as and for the purpose specified.

4. The cultivator coupling comprising the wear plate having an aperture or eye at its front end, a bolt extending up through the said plate, a second plate resting on the first plate having an aperture through which the bolt passes and provided with a socket at its forward end having notches in one end, and nuts on the bolt for clamping the socket plate to the wear plate at any desired angle, substantially as described.

HENRY STRASSER.

Witnesses:
GEORGE G. BRUCE,
ELGIN K. BRUCE, Jr.